United States Patent [19]

Tivy

[11] 4,249,164
[45] Feb. 3, 1981

[54] FLOW METER

[76] Inventor: Vincent V. Tivy, 17622 Merry Oaks Trail, Chagrin Falls, Ohio 44022

[21] Appl. No.: 38,926

[22] Filed: May 14, 1979

[51] Int. Cl.³ .......................... G01F 1/26; H01V 7/00; G08C 19/00
[52] U.S. Cl. .............................. 340/870.3; 73/861.08; 73/861.42; 340/611
[58] Field of Search ...................... 340/611, 191; 73/3, 73/211, 194 R, 194 E, 194 M, 205 R, 205 D

[56] References Cited
U.S. PATENT DOCUMENTS

| | | | |
|---|---|---|---|
| 3,388,597 | 6/1968 | Bargen et al. .................. | 73/205 R |
| 3,430,489 | 3/1969 | Pfrehm ........................... | 73/205 R |
| 3,494,190 | 2/1970 | Schwartzman ................ | 73/205 R |
| 3,561,831 | 2/1971 | Alibert et al. .................. | 73/194 E |
| 4,100,798 | 7/1978 | Nilsson et al. ................. | 73/194 E |

Primary Examiner—Thomas A. Robinson
Attorney, Agent, or Firm—John F. Luhrs

[57] ABSTRACT

A delta-P transmitter generating a signal corresponding to the differential pressure produced by a primary element installed in a conduit through which a fluid flows, comprising the primary element and a transducer implanted in the primary element to generate a signal corresponding to the differential pressure with which may be combined the signals generated by a temperature transducer and/or an absolute pressure transducer to generate an output signal corresponding to the weight or mass rate of fluid flow.

10 Claims, 11 Drawing Figures

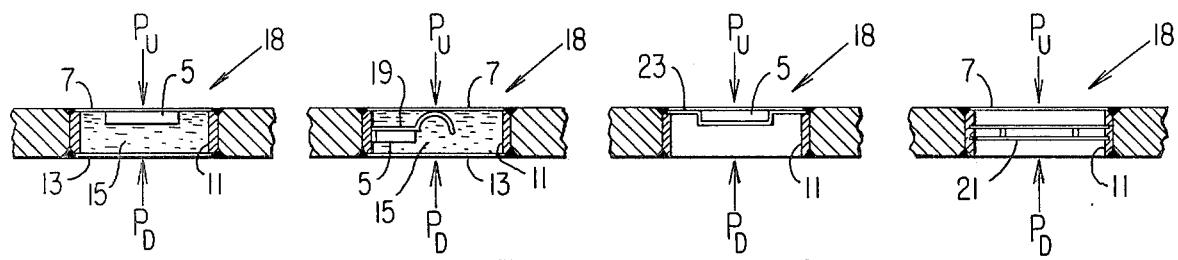
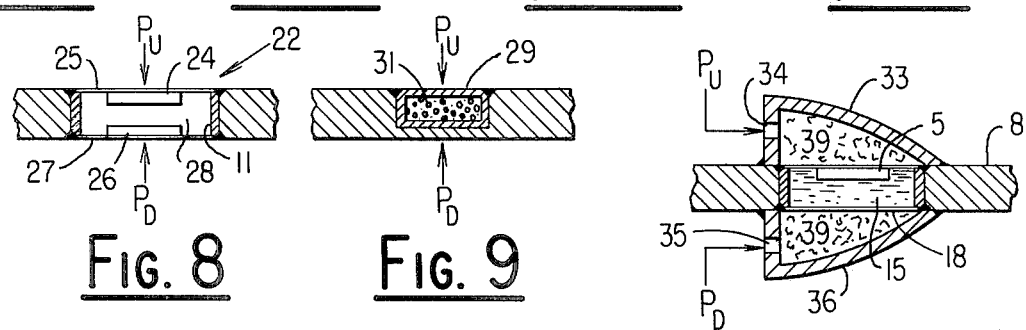
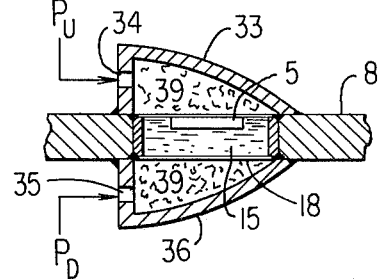
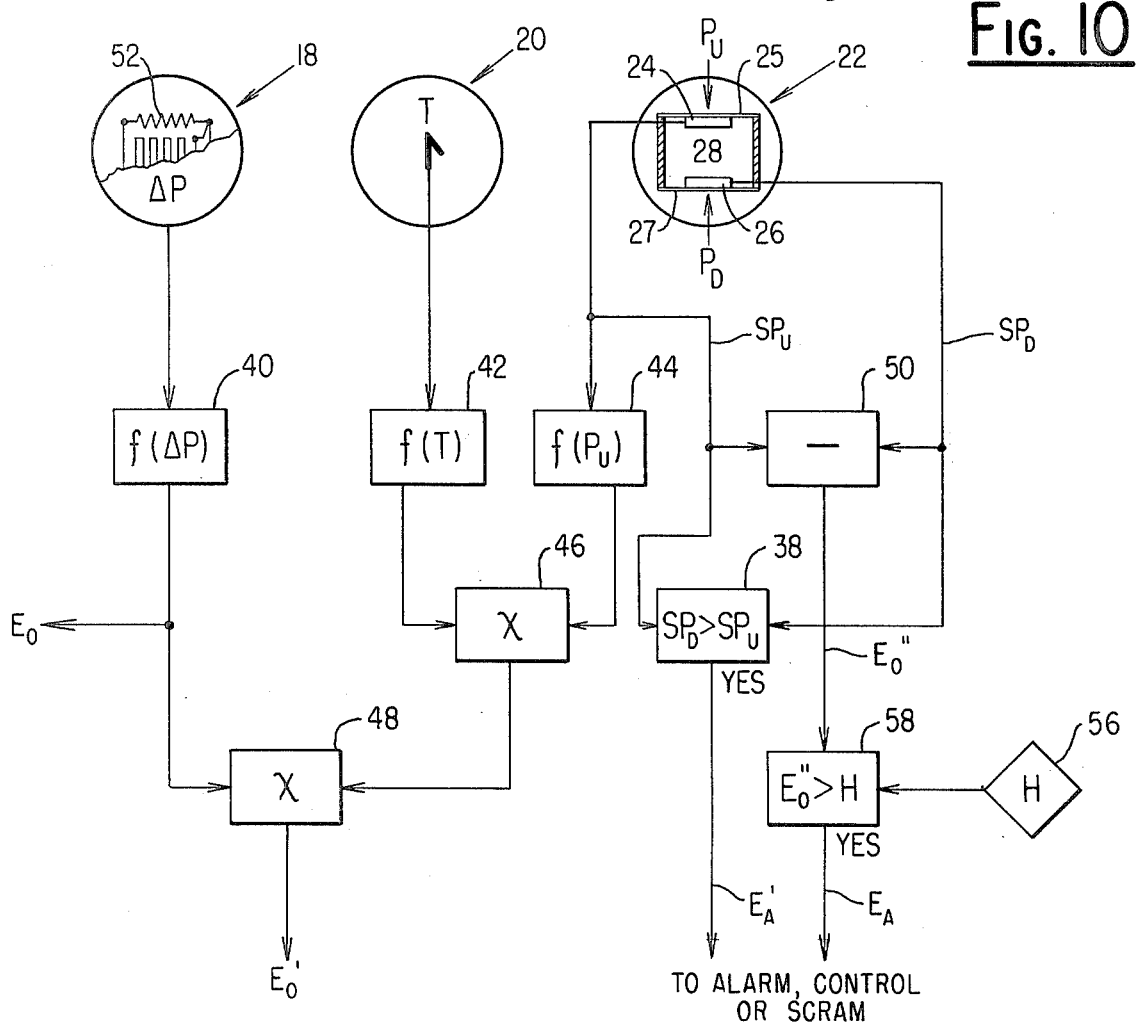

FLOW METER

This invention relates to a flow meter and more particularly to a meter for measuring the rate of flow of a fluid through a pipe or conduit.

Presently such a flow is commonly measured by means of a primary element, such as a flat-plate orifice, flow nozzle or venturi tube installed in the conduit and producing a differential pressure proportional to the square of the rate of flow. To measure the differential the conduit is penetrated upstream and downstream of the primary element at selected distances by pressure taps connected to a delta-P transmitter generating an output signal corresponding to the differential pressure.

A wide variety of delta-P transmitters are available such as, but not limited to, bellows operated, diaphragm operated and mercury manometer operated. All of such transmitters suffer at least loss of calibration and possibly catastrophic failure, such as bellows or diaphragm distortion or rupture, when subjected to an over-range differential pressure as frequently occurs in placing a transmitter in or out of service or by rupture of a connecting tube.

If the fluid is a vapor, such as steam, it is frequently necessary to install radiators at the pressure taps in order that the delta-P transmitter and connecting tubes be filled with condensate. When measuring the rate of flow of a deleterious liquid, or a liquid carrying solids in suspension, it is necessary to provide separating chambers in the connecting tubes to maintain a benevolent liquid in the transmitter, or to provide an elaborate back-flush arrangement to periodically or continuously flush the connecting tubes with a benevolent liquid.

Additionally, the installation of available delta-P transmitters is expensive, requiring penetrations into the fluid carrying conduit, the removal of burrs protruding into the conduit as a result of the penetrations, the running of connecting tubes to the transmitter, and the installation of root valves at the penetrations and shut-off valves and an equalizing valve at the transmitter.

In accordance with this invention the foregoing deficiencies are eliminated by incorporating or, as it may be said, implanting in the primary element a delta-P transducer, thereby eliminating the necessity for pipe penetrations, valves, connecting tubing and the like and the probability that the transducer will be subject to a differential pressure other than that produced by the primary element.

Further in accordance with this invention pressure and temperature transducers may also be incorporated or implanted in the primary element which may be utilized to compensate the output signal of the delta-P transducer for variations in temperature and/or pressure of the fluid.

These and other objectives of this invention will be apparent from the following description and from the drawings in which:

IN THE DRAWINGS

FIG. 4 is a cross-section view of one type of differential pressure transducer taken along the line 4—4 of FIG. 3.

FIGS. 5, 6 and 7 illustrate alternate forms of the differential pressure transducer shown in FIG. 4.

FIG. 8 is a cross-section view of an absolute pressure transducer taken along the line 8—8 of FIG. 3.

FIG. 9 is a cross-section view of a wireway shown in FIG. 3 taken along the line 9—9.

FIG. 10 is a cross-sectional view of plenum chambers for introducing the upstream and downstream pressures into the transducers shown in FIGS. 4, 5, 6 and 7.

FIG. 11 is a one-line logic diagram of a computing circuit generating an output signal corresponding to the weight or mass rate of fluid flow.

DETAILED DESCRIPTION

Figure 1:
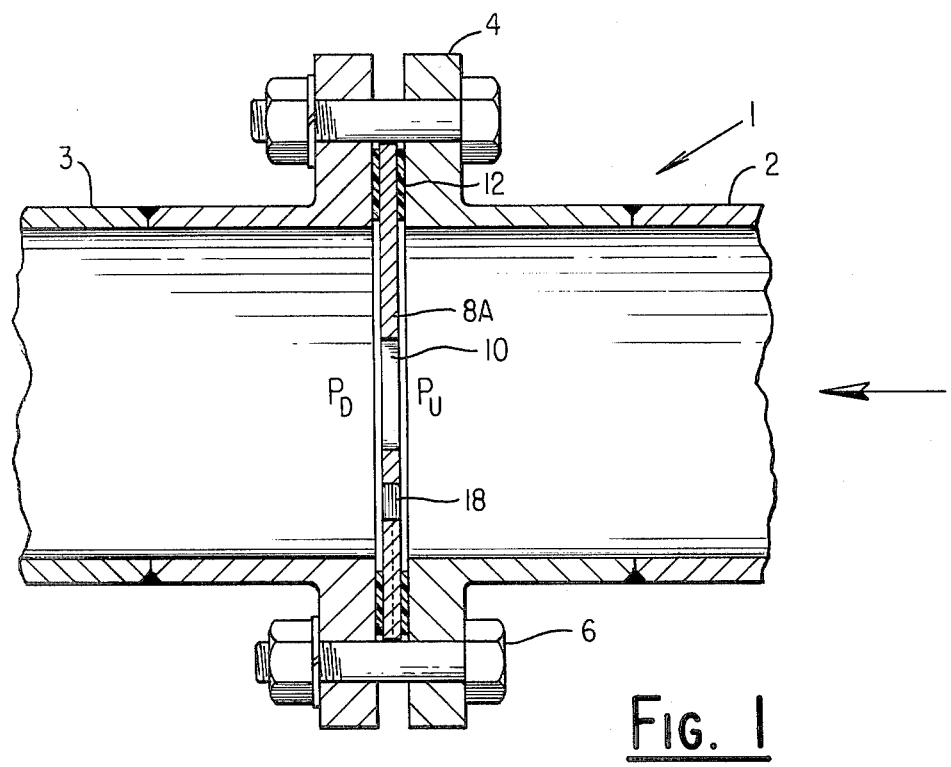
FIGS. 1 and 2 are cross-section views of typical installations of primary elements in which are incorporated transducers according to this invention.
Figure 2:
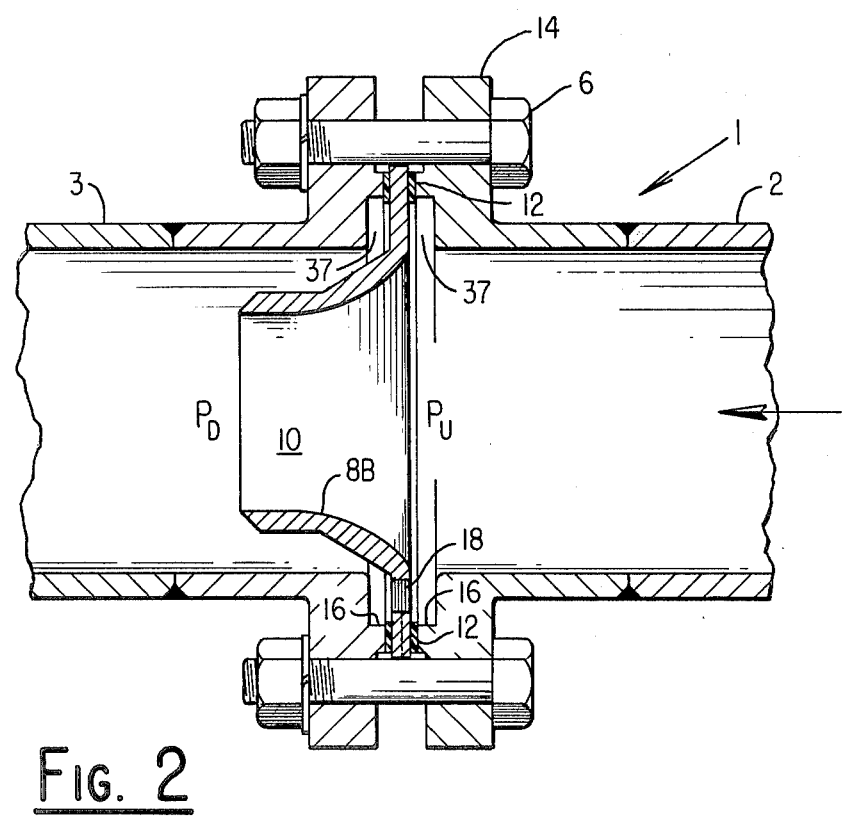
Figure 3:
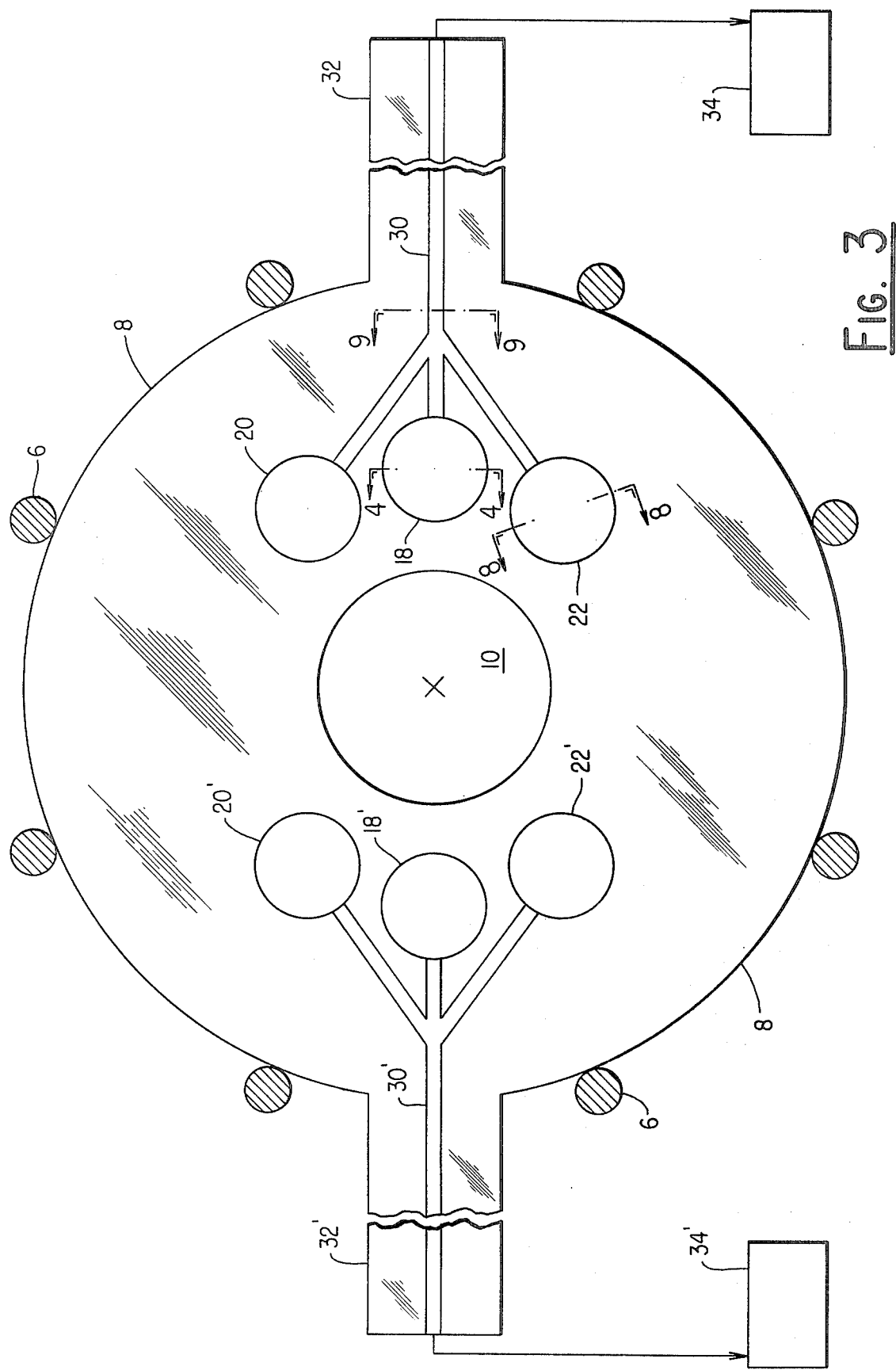
FIG. 3 illustrates a primary element as viewed from the inlet or upstream side in which are incorporated transducers in accordance with this invention.

Referring to the drawings, wherein like reference characters designate like or corresponding elements throughout the several views, there is shown in cross-section a fluid conducting conduit, generally indicated at 1, having a section 2 and a section 3 joined together, in FIG. 1 by a pair of flat faced flanges 4 held together by means of a plurality of bolts 6. Clamped between the flanges is a primary element having an orifice 10 through which the fluid flows. Suitable gaskets, such as shown at 12, are installed on either side of the primary element to maintain a pressure tight assembly. In FIG. 1 the primary element is illustrated as an orifice plate 8A, whereas in FIG. 2 the primary element is illustrated as a flow nozzle 8B clamped between a pair of flanges 14, each having a raised face 16 providing an annular plenum or piezometer ring 37 on the inlet and outlet sides of the primary element 8B. As evident, the orifice plate 8A can be installed in the arrangement shown in FIG. 2 and conversely the flow nozzle 8B can be installed in the arrangement shown in FIG. 1. The primary element 8, FIG. 3, shows either the orifice plate 8A or the flow nozzle 8B as viewed from the upstream or inlet side. Hereafter, where in the description reference is made to the primary element 8, it shall be taken to mean an orifice plate 8A, a flow nozzle 8B or other type of differential pressure producing device.

Implanted in the primary element 8 is a transducer 18 for generating a signal proportional to the differential pressure produced by the flow of fluid through the orifice 10 in the primary element, which in the case of an orifice plate 8A can be any one of the known types such as concentric, eccentric or segmental. There may also be implanted in the primary element 8 a temperature transducer 20 such as a thermocouple or resistance thermometer and a duplex absolute pressure transducer 22. The transducers 18 and 22 may generate the signal by a change in resistance, capacitance or inductance. By way of illustration, this invention will be described by specific reference to transducers producing a change in resistance and capacitance.

Referring to FIG. 4 there is shown in cross-section the transducer 18 as comprising a capsule having a supporting rim 11, of circular or other desired configuration, to which are secured in pressure tight relationship flexure diaphragms 7 and 13 to form a sealed chamber 15 filled with a non-compressible, low temperature coefficient, high boiling point liquid, such as silicone. The outer face of one diaphragm, such as the diaphragm 7, is subject to the fluid pressure ($P_U$) on the inlet or upstream side of the primary element, whereas the outer face of the other diaphragm 13 is subject to the fluid pressure ($P_D$) on the outlet or downstream side of the primary element. The differential pressure acting on the diaphragms is therefore the differential pressure produced by the flow of fluid through the orifice 10 and each diaphragm will flex from a null or neutral position in proportion to this differential pressure. To produce a signal proportional to this differential pressure there is bonded, as shown in FIG. 4, to the flexure diaphragm 7 a bi-axial strain gauge 5, having, as shown in FIG. 11, one winding predominantly sensitive to diaphragm flexing and a temperature compensating winding 52 predominantly sensitive to ambient temperature.

The transducer 18 is implanted in a conforming hole drilled or otherwise formed in the primary element 8 and bonded thereto by any suitable means such as welding, brazing or the like. If stresses on the primary element are likely to produce significant strains, the transmission thereof to the transducer can be inhibited by bonding the rim 11 to the primary element through flexures or an equivalent means.

In FIG. 5 there is shown a modified form of the transducer 18 wherein the strain gauge 5 is secured to a flexure spring 19 having one end anchored to the rim 11 and the free end provided with a cusp engaging the diaphragm 7.

A further modification of the transducer 18 is shown in FIG. 6 wherein there is provided a two-ply diaphragm 23 to which the strain gauge 5 is bonded between the plys. The plys may be bonded together by epoxy brazing or welding, or, in the alternative, the space between the diaphragm plys can be evacuated to thereby cause the diaphragms to collapse toward each other and flex as a unit.

The strain gauge 5, as illustrated in FIGS. 4, 5 and 6 can be either the wire wound or thin-film type, the latter being particularly suitable for the transducer shown in FIG. 6 with the thin-film configuration bonded to the interior surfaces of the plys.

In FIG. 7 the diaphragm 7 forms a capacitance plate movable toward and away from an insulated non-flexing capacitance plate 21 to thereby generate a signal proportional to differential pressure.

As shown in FIG. 8, the duplex absolute pressure transducer 22 comprises a bi-axial strain gauge 24, which may be either the wire wound or thin-film type bonded to a diaphragm 25, responsive to the pressure on the upstream side of the primary element 8, and a similar strain gauge 26 bonded to a diaphragm 27, responsive to the pressure on the downstream side of primary element 8, separated by an evacuated chamber 28.

The leads to and from the transducers 18, 20 and 22 are carried through suitable seals, a wireway 30 implanted in the primary element 8 and ear or tab 32, to a connector 34, which because of the low potentials, may, if required, be of the intrinsically safe type. FIG. 9 shows a typical cross-section of the wireway 30, as taken along the line 9—9 of FIG. 3, which comprises a pressure tight material sheath 29 housing the required number of leads packed in a ceramic insulating material 31.

While a single set of transducers 18, 20 and 22 are sufficient to satisfy the requirements of the great majority of applications, where the service is critical and redundancy is required, a duplicate set of transducers as shown at 18', 20' and 22' and a duplicate wireway 30' may be implanted in the primary element 8.

As shown in FIG. 10, the transducer 18, and as evident transducers 20 and 22, may be housed in plenum chambers 33, 36 on the upstream and downstream sides respectively of the primary element 8. Such chambers serve to protect the transducers from injury caused by careless handling prior to or during installation, or by solids which may be carried in the flowing fluid. Static pressure inlet ports 34, 35 may be located relative to the primary element to conform to the distances prescribed for the so-called corner taps or by the one inch upstream and downstream taps. The plenum chambers 33, 36 may be packed with a filtering material such as ceramic beads, wire screening or the like, serving to dampen pressure pulsations usually present and commonly referred to as noise.

The transducers 18, 20 and 22 may be located in the primary element 8 is required by the specific type of primary element and flanges. Thus with a flat orifice plate 8A installed between flat faced flanges, as shown in FIG. 1, the transducers can be located in the primary element between the inside diameter of conduit 1 and the orifice 10. If the primary element is installed between flanges 14, such as shown in FIG. 2, the transducers can be located in the annular space 37 between the conduit inside diameter and raised faces 16.

Referring to FIG. 11, which is a one line schematic diagram of a circuit for computing weight or mass rate of flow from the signals generated by the transducers 18, 20 and 22, it will be noted that conventional logic symbols have been used, as it will be recognized that the components, or hardware, as it is sometimes called, which such symbols represent, are commercially available and their operation well understood. Further, conventional logic symbols have been used to avoid specific identification with any particular type of components such as analog or digital, or as may be incorporated in a digital computer.

As known, the rate of fluid flow through the orifice in a primary element varies as the square root of the differential pressure produced by the primary element divided by the specific volume of the fluid. Practical considerations dictate that a delta-P transmitter generate a predetermined maximum output signal at a selected maximum differential pressure and that the primary element be designed to produce the differential pressure at a selected maximum rate of fluid flow and specific volume.

In FIG. 11 there is shown a function generator 40 responsive to the signal generated by the transmitter 18, which at design conditions produces an output signal $E_O$ varying in straight line relationship with the rate of fluid flow. If required, the programmed relationship between the input signal to and the output signal from the function generator 40 can also be such as to compensate for nonlinearity between the signal generated by the transmitter 18 and differential pressure.

The pressure and temperature of the flowing fluid are used to determine the corrections necessary for deviations in the specific volume or density of the flowing fluid from the design values. If the flowing fluid is a liquid ordinarily the specific volume or density is solely a function of temperature, however if the flowing fluid is a vapor or gas the specific volume or density is a function of both temperature and pressure.

Incorporated in the computing circuit of FIG. 11 is a function generator 42 responsive to the signal generated by transducer 20 which generates an output signal corresponding to the correction required for deviations in specific volume caused by deviations in actual fluid temperature from the fluid temperature at design conditions. Also incorporated in the computing circuit is a function generator 44 responsive to the signal generated by the transducer 24 which generates an output signal corresponding to the correction required for deviations in specific volume caused by deviations in actual fluid pressure from the fluid pressure at design conditions. A signal corresponding to a composite correction factor for both temperature and pressure variations is generated in a multiplier 46 and applied to the output signal $E_O$ in a multiplier 48, generating an output signal $E'_O$ corresponding to the weight or mass, as it is sometimes called, rate of fluid flow.

Transducer 18, incorporated in the primary element 8, is, as previously mentioned, subject solely to the differential pressure produced by the fluid in flowing through the orifice 10 in the primary element 8, accordingly, no protective over range device is ordinarily required. In extremely critical applications where false differential pressures may be encountered due, for example, to partial or complete blocking of the orifice 10, this invention further comprehends the generation of an alarm and/or scram signal. As shown in FIG. 11 in a difference unit 50 the signal $SP_D$ generated by strain gauge 26 is subtracted from the signal $SP_U$ generated by strain gauge 24 and when the output signal $E_O''$ therefrom exceeds a predetermined value as established by a manually adjustable unit 56, a signal $E_A$, generated in a comparison unit 58, is available for alarm, control or scram. A flow reversal is detected by comparing the relative magnitudes of signals $SP_D$ and $SP_U$ in a logic unit 38, which, when the first named signal is greater than the last named signal, generates an alarm, control or scram signal $E_A'$.

While the output signal of the transducer 18 may be compensated for changes in temperature by the inclusion of a resistance element 52, oriented to be responsive to changes in temperature and coupled with the differential pressure responsive strain gauge element in a conventional bridge circuit (not shown), in the alternative the function generator 42 may be programmed to produce a composite output signal incorporating strain gauge temperature compensation for the transducer 18 as well as compensation required for deviations in specific volume of the fluid due to deviations in actual fluid temperature from the fluid temperature at design conditions.

I claim:

1. A delta-P transmitter for producing an output signal varying in functional relationship with the rate of fluid flow through a conduit, comprising, a primary element consisting of a rigid disk for installation in the conduit and provided with an orifice for the flow of fluid therethrough producing a differential pressure between the inlet and outlet sides of said disk varying in functional relation to the rate of fluid flow, a first aperture between the inlet and outlet sides of said disk, a first flexure diaphragm sealing said aperture flexing in proportion to said differential pressure and a transducer operatively connected to said diaphragm generating an output signal proportional to the flexing of said diaphragm.

2. A delta-P transmitter as set forth in claim 1 further including a hermetically sealed liquid filler chamber comprising said first and a second flexure diaphragm secured to and separated by a supporting rim implanted in said first aperture and said transducer being mounted within said chamber responsive to the flexing of said diaphragms in accordance with changes in said differential pressure.

3. A delta-P transmitter as set forth in claim 1 wherein said transducer is a strain gauge.

4. A delta-P transmitter as set forth in claim 1 further including a temperature transducer implanted in said primary element for producing an output signal proportional to the temperature of the fluid.

5. A delta-P transmitter as set forth in claim 1 further including an absolute pressure transducer implanted in said primary element producing an output signal proportional to the absolute pressure of the fluid.

6. A delta-P transmitter as set forth in claim 1 wherein said primary element is provided with a second aperture further including a duplex absolute pressure transducer comprising an evacuated chamber implanted in said second aperture having a first transducer responsive to the pressure on the inlet side of said primary element for producing an output signal proportional to the absolute pressure on the inlet side of said primary element and a second transducer responsive to the pressure on the outlet side of said primary element for producing an output signal proportional to the absolute pressure on the outlet side of said primary element.

7. In combination with a delta-P transmitter as set forth in claim 6 further including means responsive to the output signals of said duplex absolute pressure transducer generating an output signal proportional to the difference between said signals and means generating an alarm signal when said output signal exceeds a predetermined value.

8. A delta-P transmitter as set forth in claim 1 wherein said transducer comprises a variable capacitor having a stationary plate and a cooperating flexure diaphragm movable toward and away from said stationary plate in accordance with changes in said differential pressure.

9. A delta-P transmitter as set forth in claim 1 further including a wireway for transmitting said signal to a receiving device comprising a plurality of conductors packed in an insulating material hermetically sealed in a metal sheath implanted in said primary element.

10. In combination with a delta-P transmitter as set forth in claim 1 wherein said output signal varies in non-linear relationship to the weight rate of fluid flow at a predetermined density of the fluid, further including means generating a second signal corresponding to changes in the density of the fluid and computer means responsive to said signals generating a second output signal linearly proportional to the weight rate of fluid flow through said conduit.

* * * * *